J. K. RICHIE.
BALANCE SCALES.
APPLICATION FILED APR. 11, 1919.

1,318,595.

Patented Oct. 14, 1919.

Witness
F. B. Wooden.

J. K. Richie, Inventor
By C. A. Snow & Co.
Attorneys

UNITED STATES PATENT OFFICE.

JAMES KING RICHIE, OF BUTLER, PENNSYLVANIA.

BALANCE-SCALES.

1,318,595.     Specification of Letters Patent.     Patented Oct. 14, 1919.

Application filed April 11, 1919. Serial No. 289,321.

*To all whom it may concern:*

Be it known that I, JAMES K. RICHIE, a citizen of the United States, residing at Butler, in the county of Butler and State of Pennsylvania, have invented a new and useful Balance-Scales, of which the following is a specification.

My invention relates to weighing scales and has as its primary object to provide a weighing scales which is principally adapted to weighing light articles of mail and which will dispense with weights, springs, etc.

A further object of the invention resides in the provision of a weighing scales for weighing mail which is provided with a scale of prices which corresponds to the weight graduations on the scales.

Another object of the invention is to provide a weighing scales which is always accurate and uniform, due to the fact that springs are dispensed with that ordinarily vary in tension after use, thereby rendering the scales inaccurate.

An additional object is to provide a weighing scales which is simple in construction, consists of few parts which may be readily assembled and disassembled and which may be manufactured and placed on the market at a minimum cost.

With the above and other objects and advantages in view, the invention consists of novel combinations of elements, arrangement of parts, specific details and general assemblage which will be hereinafter fully set forth and illustrated in the accompanying drawing.

On the drawing, Figure 1 is an elevation of my improved weighing scales;

Figure 1:
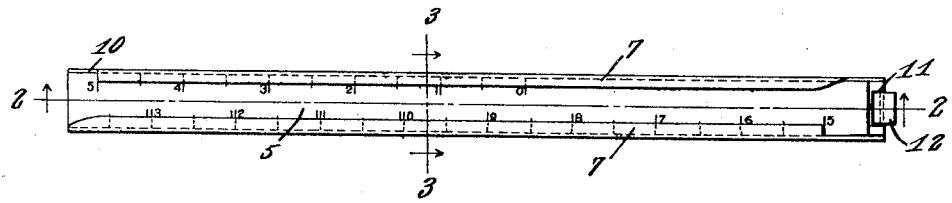
Figure 2:
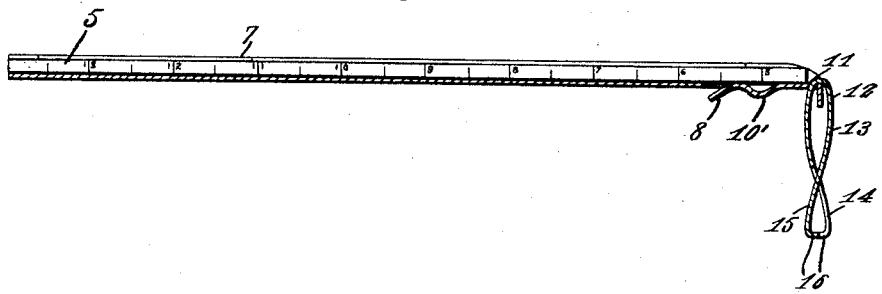
Fig. 2 is a longitudinal sectional view of the same.
Figure 3:
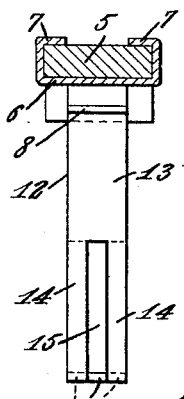
Fig. 3 is a transverse sectional view of the device looking toward its forward end.

Referring to the drawing the numeral 5 denotes a slide bar, one face of which is graduated to indicate weight while its opposite face is graduated to indicate the amount of postage for the various weight graduations.

A metal slide holder or balance beam 6 is provided which has its longitudinal edges bent in parallelism and then extended inwardly to afford L shaped guides 7 which receive the slide bar 5. Struck from the holder or beam adjacent one end is a tongue or balance point 8 which is disposed obliquely and is adapted to rest upon a table or other support. One of the inturned longitudinal edges of the guides 7 is cut out at its opposite end to provide sight opening 10 in which the graduations are brought to view and indicate the weight of the letter, etc. A boss or projection 10' is formed upon the beam 6 by means of which the beam is adjusted relative to the slide.

The forward transverse end of the holder 5 is bent downwardly and an opening 11 formed therein. Loosely disposed in the opening 11 and depending therefrom is a letter supporting clamp 12 which is formed from a length of resilient metal that is bent in the form of a loop 13 and has one end bifurcated to provide a pair of legs 14. The opposite end of the metal is reduced to provide a leg 15 which is adapted to be disposed between the legs 14. The ends of these legs are bent at right angles to provide gripping members 16 which engage the letter at opposite sides thereof.

The construction set forth is considered preferable but in no sense do I limit myself to the details set forth. I wish to here state that the invention may be modified and that my limits of modification are only governed by the appended claims.

What is claimed is:

1. In a device of the character described, a balance beam, the longitudinal edges of the beam being provided with L shaped guides, a scale bar slidable in the guides, the forward end of the beam being bent downwardly and having an opening therein, a balance point struck from the beam, and a letter supporting clamp depending from the opening.

2. A device of the class described comprising a balance beam, a scale bar slidably engaged therewith, a finger engaging member struck from the balance beam adjacent one end thereof, the finger engaging member terminating in an angularly disposed balance point, and means for supporting the articles to be weighed on the beam adjacent the balance point.

3. A device of the class described comprising a channel shaped balance beam, a scale bar longitudinally adjustable therein, a finger engaging boss struck from the balance beam adjacent one end thereof, and an angularly disposed balance point formed with the boss.

In testimony that I claim the foregoing as my own I have hereto affixed my signature in the presence of two witnesses.

JAMES KING RICHIE.

Witnesses:
H. R. FORSYTHE,
ERNEST E. HESS.

Copies of this patent may be obtained for five cents each, by addressing the "Commissioner of Patents, Washington, D. C."